US010695753B2

(12) United States Patent
Lofficial et al.

(10) Patent No.: US 10,695,753 B2
(45) Date of Patent: Jun. 30, 2020

(54) PHOTOCATALYTIC COMPOSITION THAT COMPRISES METAL PARTICLES AND TWO SEMICONDUCTORS INCLUDING ONE MADE OF INDIUM OXIDE

(71) Applicants: Centre National de la Recherche Scientifique, Paris (FR); Universite Claude Bernard—Lyon 1, Villeurbanne (FR); IFP Energies Nouvelles, Rueil-Malmaison (FR)

(72) Inventors: Dina Lofficial, Villeurbanne (FR); Antoine Fecant, Brignais (FR); Denis Uzio, Oullins (FR); Eric Puzenat, Lyons (FR); Christophe Geantet, Miribel (FR)

(73) Assignees: Centre National de la Recherche Scientifique, Paris (FR); Universite Claude Bernard-Lyon 1, Villeurbanne (FR); IFP Energies Nouvelles, Rueil-Malmaison (FR)

( * ) Notice: Subject to any disclaimer, the term of this patent is extended or adjusted under 35 U.S.C. 154(b) by 476 days.

(21) Appl. No.: 15/518,931

(22) PCT Filed: Oct. 6, 2015

(86) PCT No.: PCT/EP2015/072997
§ 371 (c)(1),
(2) Date: Apr. 13, 2017

(87) PCT Pub. No.: WO2016/058863
PCT Pub. Date: Apr. 21, 2016

(65) Prior Publication Data
US 2017/0239647 A1  Aug. 24, 2017

(30) Foreign Application Priority Data
Oct. 14, 2014  (FR) ..................... 14 59849

(51) Int. Cl.
| B01J 23/26 | (2006.01) |
| B01J 23/66 | (2006.01) |
| B01J 37/03 | (2006.01) |
| B01J 37/34 | (2006.01) |
| B01J 23/62 | (2006.01) |
| B01J 35/00 | (2006.01) |
| C01B 3/26 | (2006.01) |
| C01B 3/22 | (2006.01) |
| B01J 35/02 | (2006.01) |
| B01J 37/00 | (2006.01) |
| B01J 37/04 | (2006.01) |
| B01J 37/06 | (2006.01) |
| B01J 37/08 | (2006.01) |

(52) U.S. Cl.
CPC ............ *B01J 23/66* (2013.01); *B01J 23/62* (2013.01); *B01J 35/004* (2013.01); *B01J 35/0006* (2013.01); *B01J 35/008* (2013.01); *B01J 35/0013* (2013.01); *B01J 35/026* (2013.01); *B01J 37/009* (2013.01); *B01J 37/035* (2013.01); *B01J 37/04* (2013.01); *B01J 37/06* (2013.01); *B01J 37/08* (2013.01); *B01J 37/345* (2013.01); *C01B 3/22* (2013.01); *C01B 3/26* (2013.01); *B01J 2523/00* (2013.01); *C01B 2203/0277* (2013.01); *C01B 2203/107* (2013.01); *C01B 2203/1041* (2013.01); *C01B 2203/1064* (2013.01); *C01B 2203/1211* (2013.01)

(58) Field of Classification Search
None
See application file for complete search history.

(56) References Cited

U.S. PATENT DOCUMENTS

| 2005/0052600 A1* | 3/2005 | Hashimoto ....... G02F 1/133734 349/130 |
| 2006/0210636 A1 | 9/2006 | Nonninger et al. |
| 2010/0078624 A1* | 4/2010 | Moon ................. B82Y 20/00 257/13 |

OTHER PUBLICATIONS

Chopra, fabrication and characterization of copper oxide (CuO)-gold (Au)-titania (TiO2) and copper oxide (CuO)-gold (Au)-indium tin oxide (ITO) nanowire heterostructures, materials characterization, 96, pp. 71-77 (Year: 2014).*
Zhai et al, Photocatalytic Conversion of Carbon Dioxide with Water into Methane: Platinum and Copper(I) Oxide Co-catalysts with a Core-Shell Structure, angew. chem. int. ed, 52, pp. 5776-5779 (Year: 2013).*
Chopra, fabrication and characterization of copper oxide (CuO)-gold (Au)-titania (TiO2) and copper oxide (CuO)-gold (Au)-indium tin oxide (ITO) nanowire heterostructures, material characterization, 96, pp. 71-77 (Year: 2014).*
International Search Report dated Dec. 9, 2015 issued in corresponding PCT/EP2015/072997 application (4 pages).
N. Chopra et al., "Fabrication and Characterization of Copper Oxide (CuO)-Gold (Au)-Titania (TiO2) and Copper Oxide (CuO)-Gold (Au)-Indium Tin Oxide (ITO) Nanowire Heterostructures", Materials Characterization, vol. 96 (2014) pp. 71-77.

(Continued)

*Primary Examiner* — Stefanie J Cohen
(74) *Attorney, Agent, or Firm* — Millen, White, Zelano and Branigan, P.C.

(57) ABSTRACT

The invention relates to a composition that contains a first semiconductor SC1, particles that comprise one or more element(s) M in the metal state selected from among an element of groups IVB, VB, VIB, VIIB, VIIIB, IB, IIB, IIIA, IVA and VA of the periodic table, and a second semiconductor SC2 that comprises indium oxide, with said first semiconductor SC1 being in direct contact with said particles that comprise one or more element(s) M in the metal state, with said particles being in direct contact with said second semiconductor SC2 that comprises indium oxide in such a way that the second semiconductor SC2 covers at least 50% of the surfaces of the particles that comprise one or more element(s) M in the metal state. The invention also relates to its preparation method as well as its application of photocatalysis.

11 Claims, No Drawings

(56) References Cited

OTHER PUBLICATIONS

H. Kim et al., "Enhanced Photoluminescence in Au-Embedded ITO Nanowires", Applied Materials & Interfaces, vol. 3, No. 12 (2011) pp. 4677-4681.
J-K. Song et al., Gold-Titania Nanocomposite Films With a Periodic 3D Nanostructure, Thin Solid Films, vol. 517, No. 19 (2009) pp. 5705-5709.
F. Ma et al., "Fabrication of Metallic Platinum and Indium Oxide Codoped Titania Nanotubes For The Simulated Sunlight Photocatalytic Degradation of Diethyl Phthalate", Catalysis Communications, vol. 24 (2012) pp. 75-79.
Y-C. Chen et al., "Interfacial Charge Carrier Dynamics of the Three-Component In2O3—TiO2—Pt Heterojunction System", The Journal of Physical Chemistry C, vol. 116, No. 4 (2012) pp. 2967-2975.
Q. Zhai et al., "Photocatalytic Conversion of Carbon Dioxide with Water into Methane: Platinum and Copper(I) Oxide Co-catalysts with a Core-Shell Structure", Angewandte Chemie International Edition, vol. 52. No. 22 (2013) pp. 5776-5779.
Z. Li et al., "Cu2O/Cu/TiO2 Nanotube Ohmic Heterojunction Arrays With Enhanced Photocatalytic Hydrogen Production Activity", International Journal of Hydrogen Energy, vol. 37, No. 8 (2012) pp. 6431-6437.

\* cited by examiner

PHOTOCATALYTIC COMPOSITION THAT COMPRISES METAL PARTICLES AND TWO SEMICONDUCTORS INCLUDING ONE MADE OF INDIUM OXIDE

The field of the invention is that of composite materials and their application in photocatalysis. Composite material is defined as a solid that consists of at least two compounds of different chemical natures.

Below, the groups of chemical elements are provided according to the CAS classification (CRC Handbook of Chemistry and Physics, Editor: CRC Press, Editor-in-Chief D. R. Lide, 81$^{st}$ Edition, 2000-2001). For example, group VIII according to the CAS classification corresponds to the metals of columns 8, 9 and 10 according to the new IUPAC classification.

PRIOR ART

The literature mentions examples of composite materials that contain semiconductors, in particular composite materials that consist of core-shell-type particles on the surface of a semiconductor substrate. This type of solid has been developed particularly in photocatalysis applications.

C. Li et al. (J. Hydrogen Energy, 37, pp. 6431-6437, 2012) revealed the synthesis of solids based on $TiO_2$ nanotubes on which particles of metallic copper oxidized on their surfaces are deposited by photo-assist.

H. Lin et al. (Catal. Comm., 21, pp. 91-95, 2012) propose a composite that is prepared by coprecipitation that consists of AgBr/Ag/AgI, with AgBr and AgI both being semiconductors.

By successive impregnations, C. Wang et al. (Chem. Eng. J., 237, pp. 29-37, 2014) prepared a material that comprises contacts between $WO_3$ and Pt, on the one hand, and Pt and $TiO_2$, on the other hand.

Finally, H. Tada (Nature Materials, 5, pp. 782-786, 2006) proposes a solid based on hemispherical particles having a shell of CdS around an Au core, which particles are deposited on the $TiO_2$ semiconductor.

The object of the invention is to propose a composition that contains a first semiconductor SC1, particles that comprise one or more element(s) M in the metal state selected from among an element of groups IVB, VB, VIB, VIIB, VIIIB, IB, IIB, IIIA, IVA and VA of the periodic table, a second semiconductor SC2 that comprises indium oxide, said first semiconductor SC1 being in direct contact with said particles that comprise one or more element(s) M in the metal state, with said particles being in direct contact with said second semiconductor SC2 that comprises indium oxide in such a way that the second semiconductor SC2 covers at least 50% of the surfaces of the particles that comprise one or more element(s) M in the metal state.

The use of indium oxide that constitutes the semiconductor SC2 makes it possible, surprisingly enough, to obtain a photocatalyst that has photocatalytic performances that are enhanced in relation to the known photocatalysts of the state of the art.

According to a preferred variant, the first semiconductor SC1 is also in direct contact with the second semiconductor SC2.

According to a preferred variant, said first semiconductor SC1 forms a substrate, said substrate contains on its surface core-shell-type particles, with said shell being formed by said semiconductor SC2 that comprises indium oxide, said core being formed by said particles that comprise one or more element(s) M in the metal state.

According to a variant, indium oxide for the most part consists of $In_2O_3$.

According to a variant, the element M in the metal state is selected from among platinum, palladium, gold, nickel, cobalt, ruthenium, silver, copper, rhenium, or rhodium.

According to a variant, the indium oxide content of the semiconductor SC2, expressed in terms of the element In, is between 0.01 and 50% by weight in relation to the total weight of the composition.

According to a variant, the content of element(s) M in the metal state is between 0.001 and 20% by weight in relation to the total weight of the composition.

According to a variant, said particles that comprise one or more element(s) M in the metal state come in the form of particles of sizes of between 0.5 nm and 1000 nm.

According to a variant, the composition comes in the form of nanometric powder.

According to a variant, the semiconductor SC1 is selected from among $TiO_2$, $Bi_2S_3$, $Bi_2O_3$, $Fe_2O_3$, ZnO, $WO_3$, CuO, $ZnFe_2O_4$, $MoS_2$, and $In(OH)_3$.

According to a variant, the shell has a thickness of 1 nm to 1000 nm.

The invention also relates to its method for preparation comprising the following steps:

a) A suspension that contains a first semiconductor SC1 in a liquid mixture that consists of water and/or one or more organic compounds and at least one metal precursor that is selected from among an element of groups IVB, VB, VIB, VIIB, VIIIB, IB, IIB, IIIA, IVA and VA of the periodic table is prepared while being stirred, and the suspension is irradiated by an irradiation source such that at least a portion of the emission spectrum of said source consists of photons having energies that exceed the width of the forbidden band of the semiconductor SC1, b) Then under stirring and irradiation of said irradiation source, a soluble indium precursor with a degree of oxidation of +3 is introduced into the suspension that is obtained in step a), c) Then, under stirring and irradiation of said irradiation source, a basic agent is introduced in such a way as to bring about the precipitation of indium oxide, d) Then, the composition is separated from the suspension of step c), e) The composition that is obtained in step d) is dried, f) Optionally, the dried composition that is obtained in step e) is subjected to a heat treatment.

According to a variant, the metal precursor is selected from among a precursor of platinum, palladium, gold, nickel, cobalt, ruthenium, silver, copper, rhenium, or rhodium.

According to a variant, in step c), the pH is between 5 and 13 after the basic agent is introduced.

The invention also relates to the use of the composition according to the invention or prepared according to the preparation method as a photocatalyst.

DETAILED DESCRIPTION OF THE INVENTION

Composition According to the Invention

The invention relates to a composition that contains a first semiconductor SC1, particles that comprise one or more element(s) M in the metal state that are selected from among an element of groups IVB, VB, VIB, VIIB, VIIIB, IB, IIB, IIIA, IVA and VA of the periodic table, and a second semiconductor SC2 that comprises indium oxide, with said first semiconductor SC1 being in direct contact with said particles that comprise one or more element(s) M in the metal state, said particles being in direct contact with said second semiconductor SC2 that comprises indium oxide in such a way that the second semiconductor SC2 covers at least 50% of the surfaces of the particles that comprise one or more element(s) M in the metal state.

In a preferred manner, the composition consists of a first semiconductor SC1, particles that comprise one or more element(s) M in the metal state that are selected from among an element of groups IVB, VB, VIB, VIIB, VIIIB, IB, IIB, IIIA, IVA and VA of the periodic table, and a second semiconductor SC2 that comprises indium oxide.

According to an important aspect of the invention, the first semiconductor SC1 is in direct contact with particles that comprise one or more element(s) M in the metal state, with said particles being in direct contact with a second semiconductor SC2 that comprises indium oxide. Preferably, the first semiconductor SC1 is in addition in direct contact with the second semiconductor SC2.

According to a preferred variant of the invention, said first semiconductor SC1 forms a substrate; said substrate contains on its surface core-shell-type particles, with said shell being formed by said semiconductor SC2 that comprises indium oxide, said core being formed by said particles that comprise one or more element(s) M in the metal state. The use of indium oxide that constitutes the shell of the core-shell-type particles on the surface of a semiconductor substrate SC1 according to the invention makes it possible, surprisingly enough, to obtain a photocatalyst that has enhanced photocatalytic performances in relation to the photocatalysts known from the state of the art that do not contain the core-shell-type substrate structure.

The second semiconductor SC2 covers at least 50% of the surfaces of the particles that comprise one or more element(s) M in the metal state, a surface in a preferred manner greater than 60% and in a very preferred manner greater than 75%. The coverage rate is measured by XPS (X-ray photoelectron spectrometry in English terminology), for example on an ESCA KRATOS® Axis Ultra device with an Al monochromatic source at 1486.6 eV, and a passage energy of 40 eV, and expresses the covering of the total surface of the particles that comprise one or more element(s) M in the metal state.

The shell has a thickness of 1 nm to 1000 nm, preferably 1 nm to 500 nm, and in a particularly preferred manner 2 to 50 nm.

The composition contains a first semiconductor SC1. The semiconductors SC1 that are used according to the invention comprise at least one inorganic, organic, or organic-inorganic composite semiconductor. The width of the forbidden band of the inorganic, organic or organic-inorganic semiconductor is in general between 0.1 and 5.5 eV.

According to a first variant, the semiconductor SC1 comprises at least one inorganic solid. The inorganic semiconductor can comprise one or more of the elements that are selected from among the elements of group IVA, such as silicon, germanium, silicon carbide or silicon-germanium. It can also consist of elements of groups IIIA and VA, such as GaP, GaN, InP, and InGaAs, or elements of groups IIB and VIA, such as CdS, ZnO, and ZnS, or elements of groups IB and VIIA, such as CuCl and AgBr, or elements of groups IVA and VIA, such as PbS, PbO, SnS, and PbSnTe, or elements of groups VA and VIA, such as $Bi_2Te_3$ and $Bi_2O_3$, or elements of groups IIB and VA, such as $Cd_3P_2$, $Zn_3P_2$, and $Zn_3As_2$, or elements of groups IB and VIA, such as CuO, $Cu_2O$, and $Ag_2S$, or elements of groups VIII and VIA, such as CoO, PdO, $Fe_2O_3$, and NiO, or elements of groups VIB and VIA, such as $MoS_2$ and $WO_3$, or elements of groups VB and VIA, such as $V_2O_5$ and $Nb_2O_5$, or elements of groups IVB and VIA, such as $TiO_2$ and $HfS_2$, or elements of groups IIIA and VIA, such as $In_2O_3$, $In_2S_3$, or $In(OH)_3$, or elements of groups VIA and lanthanides, such as $Ce_2O_3$, $Pr_2O_3$, $Sm_2S_3$, $Tb_2S_3$ and $La_2S_3$, or elements of groups VIA and actinides, such as $UO_2$ and $UO_3$. In a preferred manner, the semiconductor is selected from among $TiO_2$, $Bi_2S_3$, $Bi_2O_3$, CdO, $Ce_2O_3$, $CeO_2$, CoO, $Cu_2O$, $Fe_2O_3$, $FeTiO_3$, $In_2O_3$, $In(OH)_3$, NiO, PbO, ZnO, $WO_3$, CuO, $ZnFe_2O_4$, $MoS_2$, Ag2S, CdS, $Ce_2S_3$, $Cu_2S$, $CuInS_2$, $In_2S_3$, $ZnFe_2O_3$, ZnS and $ZrS_2$ and $In(OH)_3$. In a very preferred manner, the semiconductor is selected from among $TiO_2$, $Bi_2S_3$, $Bi_2O_3$, $Fe_2O_3$, ZnO, $WO_3$, CuO, $ZnFe_2O_4$, $MoS_2$, and $In(OH)_3$.

According to another variant, the semiconductor SC1 comprises at least one organic semiconductor. Among the organic semiconductors, it is possible to cite tetracene, anthracene, polythiophene, polystyrene sulfonate, phosphyrenes, and fullerenes.

According to another variant, the semiconductor SC1 comprises at least one organic-inorganic semiconductor. Among the organic-inorganic semiconductors, it is possible to cite crystallized solids of the MOF type (for Metal Organic Frameworks in English terminology). The MOFs consist of inorganic sub-units (transition metals, lanthanides . . . ) and are connected to one another by organic ligands (carboxylates, phosphonates, imidazolates . . . ), thus defining crystallized, sometimes porous, hybrid networks.

The semiconductor SC1 can optionally be doped with one or more ions that are selected from among metal ions, such as, for example, ions of V, Ni, Cr, Mo, Fe, Sn, Mn, Co, Re, Nb, Sb, La, Ce, Ta, Ti, non-metal ions, such as, for example, C, N, S, F, P, or by a mixture of metal and non-metal ions.

According to another variant, the semiconductor SC1 can be sensitized on its surface with all organic molecules that can absorb photons.

The semiconductor SC1 can come in different forms (nanometric powder, nano-objects that may or may not comprise cavities, . . . ) or shapings (films, monoliths, micron balls or millimeter balls, . . . ).

The composition contains a second semiconductor SC2. The semiconductor SC2 comprises indium oxide. Preferably, the element indium has oxidation degree +3. In a very preferred manner, the indium oxide for the most part consists of $In_2O_3$. "For the most part consists of $In_2O_3$" is defined as an $In_2O_3$ content that exceeds 50% by weight, preferably that exceeds 60% by weight, and in a particularly preferred manner that exceeds 70% of the total weight of the semiconductor SC2. Optionally, the semiconductor SC2 can in addition contain indium hydroxides. The semiconductor SC2 preferably does not contain an element of the group of metals other than indium.

The content of indium oxide, expressed in terms of the element In, is between 0.01 and 50% by weight, preferably between 0.5 and 20% by weight, in relation to the total weight of the composition.

The composition comprises particles that comprise one or more element(s) M in the metal state that are selected from among an element of groups IVB, VB, VIB, VIIB, VIIIB, IB, IIB, IIIA, IVA and VA of the periodic table. Said particles that comprise one or more element(s) M are in direct contact with said semiconductor SC1 and SC2 respectively. Said particles can consist of a single element in the metal state or several elements in the metal state that can form an alloy.

"Element in the metal state" is defined as an element that belongs to the family of metals, with said element having oxidation degree zero (and therefore in metal form).

Preferably, the element or elements M in the metal state are selected from among a metal element of groups VIIB, VIIIB, IB and IIB of the periodic table, and in a particularly preferred manner from among platinum, palladium, gold, nickel, cobalt, ruthenium, silver, copper, rhenium, or rhodium. Said particles that comprise one or more element(s) M in the metal state preferably come in the form of particles of sizes of between 0.5 nm and 1000 nm, in a very preferred manner between 0.5 nm and 100 nm.

The content of element(s) M in the metal state is between 0.001 and 20% by weight, in a preferred manner between 0.01 and 10% by weight, in relation to the total weight of the composition.

The composition according to the invention can come in different forms (nanometric powder, nano-objects that may or may not comprise cavities, . . . ) or shapings (films, monoliths, micron balls or millimeter balls, . . . ). The composition according to the invention advantageously comes in the form of nanometric powder.

Preparation of the Solid

The composition according to the invention can be prepared according to any method that is known to one skilled in the art. According to an embodiment, the composition is obtained by photodeposition of the metal element or elements M forming the metal particles (and therefore the core in a core-shell substrate structure), and then by condensation induced by precipitation while being irradiated by an indium precursor of oxidation degree +3 (forming the shell in a core-shell substrate structure) on a semiconductor SC1 (forming the substrate in a core-shell substrate structure) that contains the metal particles on its surface.

It should be noted that a preparation by the dry impregnation technique (in general seeking a high dispersion of the metal on the substrate) of a copper precursor does not make it possible to obtain a composition according to the invention in which the second semiconductor SC2 that comprises copper oxide covers at least 50% of the surfaces of the particles that comprise one or more element(s) M in the metal state.

More particularly, the method for preparation of the composition according to the invention comprises the following steps:

a) While being stirred, a suspension that contains a first semiconductor SC1 in a liquid mixture that consists of water and/or one or more organic compounds and at least one metal precursor that is selected from among an element of groups IVB, VB, VIB, VIIB, VIIIB, IB, IIB, IIIA, IVA and VA of the periodic table is prepared, and the suspension is irradiated by an irradiation source such that at least a portion of the emission spectrum of said source consists of photons having energies that exceed the width of the forbidden band of the semiconductor SC1, b) Then under stirring and irradiation of said irradiation source, a soluble indium precursor with a degree of oxidation of +3 is introduced into the suspension that is obtained in step a), c) Then, under stirring and irradiation of said irradiation source, a basic agent is introduced in such a way as to bring about the precipitation of indium oxide, d) Then, the composition is separated from the suspension of step c), e) The composition that is obtained in step d) is dried, f) Optionally, the dried composition that is obtained in step e) is subjected to a heat treatment.

Thus, in step a), while being stirred, a suspension that contains a semiconductor SC1, preferably in the form of nanometric powder, in a liquid mixture that consists of water and/or one or more organic compounds and at least one metal precursor that is selected from among an element of groups IVB, VB, VIB, VIIB, VIIIB, IB, IIB, IIIA, IVA and VA of the periodic table is prepared, and the suspension is irradiated by an irradiation source such that at least a portion of the emission spectrum of said source consists of photons having energies that exceed the width of the forbidden band of the semiconductor SC1.

The percentage of organic compounds contained in the suspension varies from 0 to 100% by volume. The organic compounds are in general primary or secondary alcohols; in a preferred manner, the organic compounds are methanol, ethanol, or isopropanol, by themselves or in a mixture.

The metal precursor is introduced into the mixture in the form of soluble powder or in solution, preferably in aqueous solution. The metal precursor is in general based on acetate, acetylacetonate, chloride, nitrate or sulfate. In a preferred manner, the metal precursor is based on chloride or nitrate.

The metal precursor is selected from among an element of groups IVB, VB, VIB, VIIB, VIIIB, IB, IIB, IIIA, IVA and VA of the periodic table, preferably from among those of groups VIIB, VIIIB, IB and IIB of the periodic table. In a very preferred manner, the precursor is a precursor of platinum, palladium, gold, nickel, cobalt, ruthenium, silver, copper, rhenium, or rhodium.

The quantities of the metal precursor that are introduced into the suspension are selected in such a way that the content of element(s) M in the metal state is between 0.001 and 20% by weight, and in a preferred manner between 0.01 and 10% by weight in relation to the total weight of the composition.

The semiconductor SC1 that is introduced in step a) is one of the semiconductors described previously.

The mixing is preferably carried out at ambient temperature while being stirred, preferably mechanically or by bubbling.

The mixture is irradiated by a source such that at least a portion of the emission spectrum consists of photons having energies that exceed the width of the forbidden band of the semiconductor that is used. Preferably, the source emits at least one wavelength range that exceeds 280 nm, in a very preferred manner 315 nm to 800 nm, which includes the UV spectrum and/or the visible spectrum. The radiation source can be any artificial or natural electromagnetic radiation source, such as the natural light from the sun, an Hg-type lamp, an Xe-type lamp, or an LED-type lamp.

The duration of this step is preferably between 1 minute and 20 hours while being irradiated, preferably between 1 minute and 5 hours.

During step a), the metal ions $M^{\delta+}$ of the precursor are reduced in the form of metal particles $M°$ on the surface of the semiconductor SC1 under the action of the electrons that are generated by the absorption of photons by said semiconductor. When the composition is in the form of a core-shell-type substrate structure, these metal particles will form the core of the composition according to the invention.

In step b), under stirring and irradiation of said irradiation source, a soluble indium precursor with a degree of oxidation +3 is introduced into the suspension that is obtained in step a).

The indium precursor is in general based on chloride, iodide, bromide, fluoride, acetate, acetylacetonate, nitrate, sulfate, and hydroxide. In a preferred manner, the precursor is indium nitrate or indium chloride.

The indium precursor can be solubilized before its introduction into water or a liquid mixture that consists of water and one or more organic compounds such as primary or secondary alcohols, and in a preferred manner, methanol, ethanol or isopropanol, by itself or in a mixture.

Optionally, and so as to ensure the solubility of the indium precursor, an acid agent can be added to the mixture so as to modulate the pH of the solution. The acid agent is selected preferably from among the inorganic acids, such as nitric, sulfuric, phosphoric, hydrochloric, or hydrobromic acid, or the organic acids, such as carboxylic or sulfonic acids. The pH of the solution is less than 7, preferably less than 5.

The quantities of the indium precursor introduced into the suspension are selected in such a way that the content of indium oxide, expressed in terms of the element In, is between 0.01 and 50% by weight, preferably between 0.5 and 20% by weight, in relation to the total weight of the composition.

The stirring and irradiation conditions are those described for step a). The stirring and irradiation conditions are preferably identical to those of step a). The duration of this step is preferably between 1 minute and 20 hours, preferably between 1 minute and 5 hours.

In step c), under stirring and irradiation of said irradiation source, a basic agent is introduced in such a way as to bring about the precipitation of indium oxide, in particular $In_2O_3$. Preferably, the pH is modified by adding a basic agent in such a way that it is within a range of between 5 and 13 after the agent is added.

The basic agent is preferably selected from among the alkaline or alkaline-earth hydroxides, the organic bases such as amines, or ammonia.

The stirring and irradiation conditions of step c) are those described for step a). The stirring and irradiation conditions are preferably identical to those of step a). The duration of this step is preferably between 1 minute and 20 hours, preferably between 1 minute and 5 hours.

During step c), the metal ions $In^{3+}$ precipitate in the form of a shell of metal oxide $In_2O_3$ on the surfaces of metal particles M deposited in step a), under the action of the basic agent that is introduced. The M/semiconductor SCI interface promotes the locating of electrons that are photogenerated by the photon absorption in said semiconductor SC1 on the surfaces of the metal particles M and thus induces a negative partial charge on the surfaces of said metal particles M, resulting in the preferred locating of the oxide shell $In_2O_3$ on the metal particles because of the electrostatic attraction between $In^{3+}$ and $M^{(\delta-)}$.

In step d), the composition is separated from the suspension of step c). The separation can be carried out by filtering or by centrifuging. Preferably, it is carried out by centrifuging. In general, this centrifuging is carried out for 10 to 60 minutes at 2000 to 10000 rpm. In a preferred manner, one to three cycles of washing with water are then carried out.

In step e), the composition that is obtained in step d) is dried. The drying is carried out between 30° C. and 200° C., in general for 1 to 48 hours, preferably in air. Optionally, this drying can be done under inert atmosphere. The drying can optionally be carried out in an oven or a rotary evaporator. The drying step can optionally be done under partial vacuum.

According to an embodiment, it is possible to carry out—between steps a) and b)—a step for separation, preferably by centrifuging, an optional washing step, and a drying step under the conditions described above.

In an optional manner, the dried composition obtained in step e) is subjected to a heat treatment (step f). The heat treatment is carried out under a stream of air, nitrogen, hydrogen, or under partial vacuum, in general at a temperature of between 50° C. and 500° C., preferably for a duration of between 1 and 16 hours.

Use in Photocatalysis

The invention also relates to the use of the composition according to the invention as a photocatalyst, and in particular as a photocatalyst for the degradation of organic compounds, such as, for example, formic acid.

The photocatalytic method for degradation of organic compounds, such as, for example, the photocatalytic degradation of formic acid, is implemented by putting into contact a stream that contains an organic compound with said composition according to the invention. Then, the composition is irradiated by at least one irradiation source that produces at least one wavelength that is suitable for the activation of said composition in such a way as to degrade the organic compound, for example formic acid into hydrogen and into $CO_2$.

The composition can be used in a photocatalytic method in liquid or gaseous medium. The implementation of the photocatalytic method can be done in a flow-through fixed bed, in a sweeping fixed bed, or in suspension (also called "slurry" in English terminology). It can also be done in reactors that are made entirely of glass or that use non-absorbent optical windows so as to make it possible for the radiation to reach the surface of the solid. The type of technology of the reactor for using the solid is generally suitable for a suspension. This type of technology is also called "slurry" in English terminology. The type of technology of the reactor can also be of the solar panel type with a sweeping or flow-through bed on a porous or non-porous substrate. The photocatalyst can also be deposited directly on optical fibers.

Any source of irradiation that emits at least one wavelength that is suitable for activation of said composition, i.e., absorbable by the composition, can be used according to the invention. The irradiation of the source is therefore such that at least a portion of the emission spectrum of said source consists of photons with energies that exceed the width of the forbidden band of the composition according to the invention. Preferably, the source emits at least one wavelength range that exceeds 280 nm, in a very preferred manner 315 nm to 800 nm, which includes the UV spectrum and/or the visible spectrum. The radiation source can be any source of artificial or natural electromagnetic radiation, such as the natural light from the sun, an Hg-type lamp, an Xe-type lamp, or an LED-type lamp.

The use of the composition is conditioned by the provision of photons that are suited to the photocatalytic system for the reaction in question and thereby is not limited to a specific range of pressure or temperature that is outside of those making it possible to ensure the stability of the product or products. The temperature range employed for the use of the composition is in general from −10° C. to +200° C., in a preferred manner from 0 to 150° C., and in a very preferred manner from 0 to 50° C. The pressure range that is employed for the use of the composition is in general from 0.01 MPa to 70 MPa (0.1 to 700 bar), and in a preferred manner from 0.1 MPa to 2 MPa (1 to 20 bar).

The invention is illustrated by the following examples that are not in any case limiting in nature.

EXAMPLES

Example 1: Solid A (In Accordance with the Invention) $In_2O_3/Pt/TiO_2$ 0.0712 g of $H_2PtCl_6,6H_2O$ (37.5% by mass of metal) is put into 500 ml of distilled water. 50 ml of this solution is drawn off and put into a glass double-jacket reactor. 3 ml of methanol and then 250 mg of $TiO_2$ (P25, Degussa™) are then added while being stirred to form a suspension.

The mixture is then left to be stirred and to be exposed to UV radiation for two hours. The lamp that is used to provide the UV radiation is a 125W mercury vapor lamp HPK™.

The mixture is then centrifuged for 10 minutes at 3000 rpm so as to recover the solid. Two cycles of washing with water are then carried out, with each of the washing cycles being followed by a centrifuging. The powder that is recovered is finally placed in an oven at 70° C. for 24 hours.

The solid A' $Pt/TiO_2$ is then obtained. The content of element Pt is measured by atomic emission spectrometry with a plasma source (or inductively-coupled plasma atomic emission spectroscopy "ICP-AES" in English terminology) at 0.93% by mass.

A solution of $In(NO_3)_3$ is prepared by dissolving 0.05 g of $In(NO_3)_3$, $xH_2O$ (Sigma-Aldrich™, 99.9%) in 50 ml of $H_2O$.

The following were introduced into the reactor: 0.10 g of the solid A', 25 ml of distilled water, and finally 25 ml of isopropanol. The system is purged in the dark under a stream of argon (100 ml/minute) for 2 hours. The reactor is thermostated at 25° C. during the entire synthesis.

The stream of argon is then slowed to 30 ml/minute, and the irradiation of the reaction mixture starts up. The lamp that is used to provide the UV radiation is a 125W mercury vapor lamp HPK™. Then, 5 ml of the indium nitrate solution is added to the mixture. The mixture is left for 1 hour to be stirred and irradiated. Then, 1 ml of a 30% $NH_3$ solution is added. The mixture is again left for 1 hour to be stirred and irradiated.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid A $In_2O_3/Pt/TiO_2$ is then obtained. The content of the element In is measured by ICP-AES at 1.9% by mass. By XPS (X-Ray Photoelectron Spectrometry in English terminology) measurement, a covering of platinum particles that exceeds 79% is measured. By transmission electron microscopy, a mean thickness of the shell of indium oxide of 5 nm around metal particles is measured.

Example 2: Solid B (in Accordance with the Invention) $In_2O_3/Pt/TiO_2$ 0.0710 g of $H_2PtCl_6,6H_2O$ (37.5% by mass of metal) is put into 500 ml of distilled water. 50 ml of this solution is drawn off and put into a glass double-jacket reactor. 3 ml of methanol and then 250 mg of $TiO_2$ (P25, Degussa™) are then added while being stirred to form a suspension.

The mixture is then left to be stirred and to be exposed to UV radiation for two hours. The lamp that is used to provide the UV radiation is a 125W mercury vapor lamp HPK™.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid B' $Pt/TiO_2$ is then obtained. The content of the element Pt is measured by ICP-AES at 0.92% by mass.

A solution of $In(NO_3)_3$ is prepared by dissolving 0.05 g of $In(NO_3)_3$, $xH_2O$ (Sigma-Aldrich™, 99.9%) in 50 ml of $H_2O$.

The following were introduced into the reactor: 0.10 g of the solid B', 25 ml of distilled water, and finally 25 ml of isopropanol. The system is purged in the dark under a stream of argon (100 ml/minute) for 2 hours. The reactor is thermostated at 25° C. during the entire synthesis.

The stream of argon is then slowed to 30 ml/minute, and the irradiation of the reaction mixture starts up. The lamp that is used to provide the UV radiation is a 125W mercury vapor lamp HPK™. Then, 10 ml of the indium nitrate solution is added to the mixture. The mixture is left for 1 hour to be stirred and irradiated. Then, 1 ml of a 30% solution of $NH_3$ is added. The mixture is again left for 1 hour to be stirred and irradiated.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid B $In_2O_3/Pt/TiO_2$ is then obtained. The content of the element In is measured by ICP-AES at 3.7% by mass. By XPS measurement, a covering of the platinum particles that exceeds 89% is measured. By transmission electron microscopy, a mean thickness of the shell of indium oxide of 10 nm around metal particles is measured.

Example 3: Solid C (In Accordance with the Invention) $In_2O_3/Pt/ZnO$ 0.0710 g of $H_2PtCl_6,6H_2O$ (37.5% by mass of metal) is put into 500 ml of distilled water. 50 ml of this solution is drawn off and put into a glass double-jacket reactor. 3 ml of methanol, and then 250 mg of ZnO (Lotus Synthesis™, specific surface area 50 $m^2/g$) are then added while being stirred to form a suspension.

The mixture is then left to be stirred and to be exposed to UV radiation for two hours. The lamp that is used to provide the UV radiation is a 125W mercury vapor lamp HPK™.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid C' Pt/ZnO is then obtained. The content of the element Pt is measured by ICP-AES at 0.80% by mass.

A solution of $In(NO_3)_3$ is prepared by dissolving 0.05 g of $In(NO_3)_3$, $xH_2O$ (Sigma-Aldrich™, 99.9%) in 50 ml of $H_2O$.

The following were introduced into the reactor: 0.10 g of the solid C', 25 ml of distilled water, and finally 25 ml of isopropanol. The system is purged in the dark under a stream of argon (100 ml/minute) for 2 hours. The reactor is thermostated at 25° C. during the entire synthesis.

The stream of argon is then slowed to 30 ml/minute, and the irradiation of the reaction mixture starts up. The lamp that is used to provide the UV radiation is a 125W mercury vapor lamp HPK™. Then, 10 ml of the indium nitrate solution is added to the mixture. The mixture is left for 1 hour to be stirred and irradiated. 1 ml of a 30% $NH_3$ solution is then added. The mixture is again left for 1 hour to be stirred and irradiated.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid C $In_2O_3/Pt/ZnO$ is then obtained. The content of the element In is measured by ICP-AES at 3.9% by mass. By XPS measurement, a covering of platinum particles that exceeds 92% is measured. By transmission electron microscopy, a mean thickness of the shell of indium oxide of 12 nm around metal particles is measured.

Example 4: Solid D (in Accordance with the Invention) $In_2O_3/Au/TiO_2$ 0.0470 g of $HAuCl_4$, $xH_2O$ (52% by mass of metal, Aldrich™) is put into 500 ml of distilled water. 50 ml of this solution is drawn off and put into a glass double-jacket reactor. 3 ml of methanol and then 250 mg of $TiO_2$ (P25, Degussa™) are then added while being stirred to form a suspension.

The mixture is then left to be stirred and to be exposed to UV radiation for two hours. The lamp that is used to provide the UV radiation is a 125W mercury vapor lamp HPK™.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

A solid D' $Au/TiO_2$ is then obtained. The content of the element Au is measured by ICP-AES at 0.95% by mass.

A solution of $In(NO_3)_3$ is prepared by dissolving 0.05 g of $In(NO_3)_3$, $xH_2O$ (Sigma-Aldrich™, 99.9%) in 50 ml of $H_2O$.

The following were introduced into the reactor: 0.10 g of the solid D', 25 ml of distilled water, and finally 25 ml of isopropanol. The system is purged in the dark under a stream of argon (100 ml/minute) for 2 hours. The reactor is thermostated at 25° C. during the entire synthesis.

The argon stream is then slowed to 30 ml/minute, and the irradiation of the reaction mixture starts up. The lamp that is used to provide the UV radiation is a 125W mercury vapor lamp HPK™. Then, 10 ml of the indium nitrate solution is added to the mixture. The mixture is left for 1 hour to be stirred and irradiated. Then, 1 ml of a 30% solution of $NH_3$ is added. The mixture is again left for 1 hour to be stirred and irradiated.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid D $In_2O_3/Au/TiO_2$ is then obtained. The content of the element In is measured by ICP-AES at 3.8% by mass. By XPS measurement, a covering of gold particles that exceeds 86% is measured. By transmission electron microscopy, a mean thickness of the shell of indium oxide of 11 nm around metal particles is measured.

Example 5: Solid E (Not in Accordance with the Invention) $In_2O_3/Pt/TiO_2$ 0.0710 g of $H_2PtCl_6,6H_2O$ (37.5% by mass of metal, Aldrich™) is put into 500 ml of distilled water. 50 ml of this solution is drawn off and put into a glass double-jacket reactor. 3 ml of methanol and then 250 mg of $TiO_2$ (P25, Degussa™) are then added while being stirred to form a suspension.

The mixture is then left to be stirred and to be exposed to UV radiation for two hours. The lamp that is used to provide the UV radiation is a 125W mercury vapor lamp HPK™.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

A solid E' $Pt/TiO_2$ is then obtained. The content of the element Pt is measured by ICP-AES at 0.94% by mass.

A solution of $In(NO_3)_3$ is prepared by dissolving 0.05 g of $In(NO_3)_3$, $xH_2O$ (Sigma-Aldrich™, 99.9%) in 50 ml of $H_2O$.

The following were introduced into the reactor: 0.10 g of the solid E', 25 ml of distilled water, and finally 25 ml of isopropanol. The system is purged in the dark under a stream of argon (100 ml/minute) for 2 hours. The reactor is thermostated at 25° C. during the entire synthesis.

The stream of argon is then slowed to 30 ml/minute. Then, 10 ml of the indium nitrate solution is added to the mixture. The mixture is left for 1 hour to be stirred and without irradiation. Then, 1 ml of a 30% solution of $NH_3$ is added. The mixture is again left for 1 hour to be stirred and without irradiation.

The mixture is then centrifuged for 10 minutes at 3000 rpm so as to recover the solid. Two cycles of washing with water are then carried out, with each of the washing cycles being followed by a centrifuging. The recovered powder is finally placed in an oven at 70° C. for 24 hours.

The solid E $In_2O_3/Pt/TiO_2$ is then obtained. The content of the element In is measured by ICP-AES at 3.6% by mass. By XPS measurement, a covering of the platinum particles on the order of 16% is measured. By transmission electron microscopy, a shell of indium oxide around metal particles is sometimes distinguished without carrying out a measurement of the mean thickness because of the inhomogeneity of the distribution.

Example 6: Solid F (Not in Accordance with the Invention) $TiO_2$

The solid F is commercial titanium dioxide $TiO_2$ P25, Degussa™.

Example 7: Evaluation of Solids by Photocatalytic Degradation of Formic Acid The solids A, B, C, D, E, and F are subjected to a photocatalytic test for production of dihydrogen by degradation of formic acid in a semi-open Pyrex reactor that is stirred and is equipped with a quartz optical window and a double jacket to regulate the test temperature.

100 mg of solids is suspended in 60 ml of an aqueous solution of formic acid at 0.5 mol/l. The tests are carried out at 25° C. under atmospheric pressure with a flow rate of argon of 5 ml/minute to entrain the dihydrogen gas that is produced and that is analyzed by gas phase chromatography. The visible UV irradiation source is provided by an Xe—Hg lamp (Asahi™, MAX302™). The irradiation power is always kept at 100%. The duration of the test is 20 hours.

The photocatalytic activities are expressed in terms of µmol of dihydrogen that is produced per hour and per range of photocatalyst. The results are recorded in Table 1. The activity values show that the solids according to the invention systematically offer the best photocatalytic performances.

TABLE 1

Performances of the Solids in Initial Activity for the Production of Dihydrogen by Degradation of Formic Acid

| | Photocatalyst SC2/M/SC1 | Initial Activity (µmol/h/g) |
|---|---|---|
| Solid A (In Accordance) | $In_2O_3/Pt/TiO_2$ | 1141 |
| Solid B (In Accordance) | $In_2O_3/Pt/TiO_2$ | 1345 |
| Solid C (In Accordance) | $In_2O_3/Pt/ZnO$ | 905 |
| Solid D (In Accordance) | $In_2O_3/Au/TiO_2$ | 1023 |
| Solid E (Not in Accordance) | $In_2O_3/Pt/TiO_2$ | 172 |
| Solid F (Not in Accordance) | $TiO_2$ | 12 |

The invention claimed is:

1. A composition that comprises a first semiconductor SC1 that is $TiO_2$, $Bi_2S_3$, $Bi_2O_3$, $Fe_2O_3$, ZnO, $WO_3$, CuO, $ZnFe_2O_4$, $MoS_2$ or $In(OH)_2$, particles comprising one or more element(s) M in the metal state that are platinum, palladium, gold, nickel, cobalt, ruthenium, silver, copper, rhenium, or rhodium, and a second semiconductor SC2 that comprises indium oxide and does not contain an element of the group of metals of the periodic table other than indium, with said first semiconductor SC1 being in direct contact with said particles that comprise one or more element(s) M in the metal state, with said particles being in direct contact with said second semiconductor SC2 that comprises indium oxide in such a way that the second semiconductor SC2 covers at least 50% of the total surfaces of the particles that comprise one or more element(s) M in the metal state, the covering rate is measured by X-ray photoelectron spectrometry, and in which said first semiconductor SC1 forms a substrate, said substrate contains on its surface core-shell particles, with said shell being formed by said semiconductor SC2 that comprises indium oxide, said core being formed by said particles that comprise one or more element(s) M in the metal state.

2. The composition according to claim 1, in which the indium oxide consists of $In_2O_3$.

3. The composition according to claim 1, in which the indium oxide content of the semiconductor SC2, expressed in terms of the element In, is 0.01 to 50% by weight in relation to the total weight of the composition.

4. The composition according to claim 1, in which the content of the one or more element(s) M in the metal state is 0.001 to 20% by weight in relation to the total weight of the composition.

5. The composition according to claim 1, in which said particles that comprise one or more element(s) M in the metal state are in the form of particles of sizes of 0.5 nm to 1000 nm.

6. The composition according to claim 1, in the form of nanometric powder.

7. The composition according to claim 1, in which the shell has a thickness of 1 nm to 1000 nm.

8. A method for preparation of the composition according to claim 1 comprising:
  a) a suspension that contains a first semiconductor SC1 in a liquid mixture that consists of water and/or one or more organic compounds and at least one metal precursor of platinum, palladium, gold, nickel, cobalt, ruthenium, silver, copper, rhenium, or rhodium is prepared while being stirred, and the suspension is irradiated by an irradiation source such that at least a portion of the emission spectrum of said source consists of photons having energies that exceed the width of the forbidden band of the semiconductor SC1,
  b) introducing, into the suspension that is obtained in a), a soluble indium precursor with a degree of oxidation of +3, under stirring and irradiation of said irradiation source,
  c) introducing a basic agent under stirring and irradiation of said irradiation source, in such a way as to bring about the precipitation of indium oxide,
  d) separating the composition from the suspension of step c),
  e) drying the composition that is obtained in step d) and
  f) optionally subjecting the dried composition that is obtained in e) to a heat treatment.

9. The preparation method according to claim 8, in which in c), having a pH between 5 and 13 after the basic agent is introduced.

10. A photocatalysis method comprising irradiating a mixture of a compound in the presence of a composition of claim 1.

11. The composition according to claim 1, in which the indium oxide which does not contain an element of the group of metals of the periodic table other than indium is $In_2O_3$.

* * * * *